(12) United States Patent
Byun (10) Patent No.: US 7,095,633 B2
(45) Date of Patent: Aug. 22, 2006

(54) POWER SUPPLY SYSTEM OF DISPLAY APPARATUS AND CONTROL METHOD THEREOF

(75) Inventor: Ho-jin Byun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 36 days.

(21) Appl. No.: 10/936,490

(22) Filed: Sep. 9, 2004

(65) Prior Publication Data

US 2005/0073867 A1 Apr. 7, 2005

(30) Foreign Application Priority Data

Oct. 1, 2003 (KR) ............... 10-2003-0068449

(51) Int. Cl.
*H02M 3/335* (2006.01)
(52) U.S. Cl. .................. 363/21.01; 363/97
(58) Field of Classification Search ............. 363/20, 363/21.01, 21.11, 21.18, 95, 97
See application file for complete search history.

(56) References Cited

U.S. PATENT DOCUMENTS 6,115,033 A * 9/2000 Choi .................... 345/211
6,232,964 B1 * 5/2001 Lee .................... 345/212

FOREIGN PATENT DOCUMENTS

| JP | 2001-109546 | 4/2001 |
| JP | 2002-312073 | 10/2002 |
| JP | 2002-373037 | 12/2002 |
| KR | 20-0152387 | 7/1999 |
| KR | 2000-0009177 | 5/2000 |
| KR | 10-0318623 | 12/2001 |

* cited by examiner

*Primary Examiner*—Adolf Berhane
(74) *Attorney, Agent, or Firm*—Staas & Halsey LLP (57) ABSTRACT

A power supply system of a display apparatus and a control method thereof comprising a DC (Direct current) converter to convert an AC (Alternating Current) voltage into a DC voltage; a PWM (Pulse Width Modulator) to generate a PWM signal; a transformer to receive the DC voltage of the DC converter and to output an AC voltage according to the PWM signal from the PWM; an output circuit to lower the AC voltage from the transformer and to supply the lowered voltage to various components; a sync signal supplier to generate a sync signal having a frequency equal to a frequency of a horizontal sync signal, which is externally input, to generate the PWM signal synchronized to the horizontal sync signal and to supply the sync signal to the PWM; and a controller to determine a power saving mode depending on whether the horizontal sync signal or a vertical sync signal is externally input, and to control the sync signal supplier to generate the sync signal having a frequency equal to the frequency of the horizontal sync signal by outputting a corresponding signal of the power saving mode and a clamp signal generated from the input horizontal sync signal to the sync signal supplier to supply power according to the determined power saving mode. With this configuration, the power supply system of a display apparatus the control method thereof provides a simply implemented circuit, thereby reducing cost and consuming less power.

15 Claims, 4 Drawing Sheets

POWER SUPPLY SYSTEM OF DISPLAY APPARATUS AND CONTROL METHOD THEREOF

CROSS-REFERENCE TO RELATED APPLICATIONS

This application claims the benefit of Korean Patent Application No. 2003-68449, which was filed on Oct. 1, 2003, in the Korean Intellectual Property Office, the disclosure of which is incorporated herein by reference.

BACKGROUND OF THE INVENTION

1. Field of the Invention

The present invention relates to a power supply system of a display apparatus and a control method thereof, and more particularly, to a power supply system of a display apparatus and a control method thereof which reduces a cost of manufacturing by simplifying a circuit and consumes less power.

2. Description of the Related Art

In display apparatuses, power supply systems supply necessary power to each component of the display apparatuses. SMPS (Switched Mode Power Supply) related technology is rapidly developing with the SMPS becoming lighter, more compact, and more efficient compared to linear power supplies.

Figure 4:
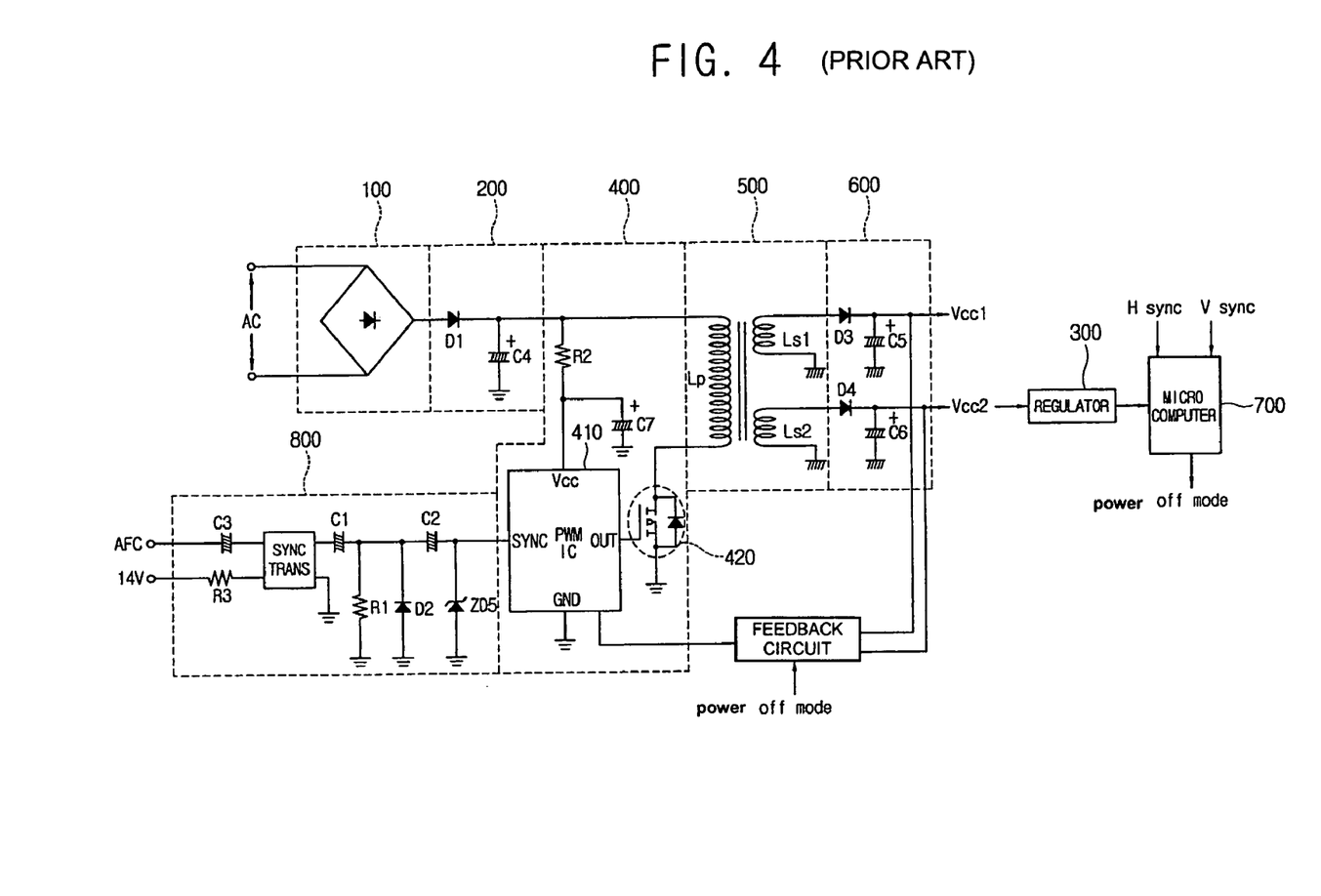
FIG. 4 is a circuit diagram of a conventional power supply system of a display apparatus.

As shown in FIG. 4, a conventional SMPS comprises a fullwave rectifier circuit 100 to convert an external AC (Alternating Current) voltage into a DC (Direct Current) voltage; a smoothing circuit 200 to smooth an output voltage of the fullwave rectifier circuit 100; a PWM (Pulse Width Modulation) circuit 400; a switching transformer 500; an output circuit 600 to rectify each voltage induced by the secondary windings Ls1 and Ls2 of the switching transformer 500 and to output the rectified voltages; a sync signal supplier 800 to supply an AFC (Automatic Frequency Control) signal to the PWM circuit 400; and a feedback circuit to maintain the output voltage of the output circuit 600 in a regular voltage level.

In the above configuration, the operation of a conventional SMPS can be described as follows. Initially, an AC voltage (100V/220V) is rectified in the fullwave rectifier circuit 100, which is then smoothed through the smoothing circuit 200. Thus, the AC voltage is converted into a DC voltage. Then, the DC voltage is applied to a primary winding Lp of the switching transformer 500. At the same time, the output voltage of the smoothing circuit 200 is supplied to the PWM circuit 400.

The PWM circuit 400 comprises a PWM IC (Integrated Circuit) 410 to generate a PWM signal, and a transistor and a diode 420, where the transistor and the diode 420 are turned on/off according to the PWM signal from the PWM IC 410.

As the transistor is repeatedly turned on/off according to the PWM signal of the PWM IC 410, inductive electromotive force is generated and transferred from the primary winding Lp to the secondary windings Ls1 and Ls2 of the switching transformer 500.

An AC voltage is output from the secondary windings Ls1 and Ls2 of the switching transformer 500 and converted into DC voltages Vcc1 and Vcc2, respectively, through the output circuit 600. The output voltages (Vcc1 and Vcc2) of the output circuit 600 are supplied to each of the circuits in the display apparatus or dropped to voltage levels that correspond to various components such as a microcomputer 700, or a video amplifier.

One deficiency of conventional SMPSs is that elements of the circuit can be damaged and the life expectancy of the switching power circuit can be shortened if the output voltages Vcc1 and Vcc2 of the output circuit 600 exceed the average voltage level. Accordingly, a feedback circuit is generally utilized in the switching power circuit to maintain the output voltages Vcc1 and Vcc2 of the output circuit 600 at a reference voltage level.

The feedback circuit senses the output voltages Vcc1 and Vcc2 of the output circuit 600, and outputs a resulting feedback signal to the PWM IC 410. The PWM IC 410 then controls a duty ratio of the PWM signal according to the feedback signal input thereto, thus maintaining the output voltages Vcc1 and Vcc2 at a regular voltage level.

Herein, the frequency of the PWM signal of the PWM IC 410 should be equal to the frequency of the horizontal sync signal provided by a computer main body, DVD player, etc. If the PWM signal frequency of the PWM IC 410 and the frequency of the horizontal sync signal are not equal to each other, the display apparatus displays noise. To equalize the PWM signal frequency and the horizontal sync signal frequency, the AFC signal that is supplied by a horizontal deflection circuit equipped to the display apparatus is applied to a sync signal input terminal of the PWM IC 410 through the sync signal supplier 800.

Provided that about 40V of the AFC signal output from the horizontal deflection circuit is converted into about 4~5V of sync signal through a sync signal transformer (hereinbelow, "a sync trans") and the converted sync signal is supplied to the PWM IC 410 through capacitors C1 and C2, a resistor R1, and diodes D2 and ZD5, the PWM IC 410 generates a PWM signal synchronized to the sync signal input thereto, thereby turning on/off the transistor.

In a power supply system of a conventional display apparatus the horizontal deflection circuit does not work when the display apparatus is switched from a normal operation mode to a power-off mode. When in the power-off mode, the sync signal cannot be supplied to the PWM IC 410 because no AFC signal exists. The microcomputer 700 provides a power-off mode signal to the feedback circuit which turns off the power by controlling an operation of the feedback circuit.

The power supply system of the conventional display apparatus has a disadvantage of added cost from complex circuitry to supply the AFC signal from the horizontal deflection circuit and the voltage (14V) of the secondary terminal of the switching transformer 500 to the sync trans. Moreover, it is difficult to lower the power consumption of the complex circuitry below 1 or 2 watts.

Additionally, the complex circuitry of a conventional display apparatus causes a delay in supplying the sync signal to the PWM IC 410 when the display apparatus is switched from a power saving mode, such as the power-off mode to the normal operation mode. Thus, the power falls below a threshold level and the microcomputer 700 needs to be reset due to the mistiming of the supply power output through the output circuit 600.

SUMMARY OF THE INVENTION

Accordingly, it is an aspect of the present invention to provide a power supply system of a display apparatus and a method thereof to implement a simple circuit to reduce cost and consume less power.

Another aspect and/or advantage of the present invention is to prevent a microcomputer from being reset because a sync signal is delayed when the display apparatus is switched from a power saving mode to a normal operation mode.

Additional aspects and/or advantages of the present invention will be set forth in part in the description that follows and, in part, will be obvious from the description, or may be learned by practicing the present invention.

The foregoing and/or other aspects of the present invention are achieved by providing a power supply system of a display apparatus comprising a DC (Direct current) converter to convert a commercial AC (Alternating Current) voltage into a DC voltage; a PWM (Pulse Width Modulator) to generate a PWM signal; a transformer to receive the DC voltage of the DC converter and to output an AC voltage according to the PWM signal from the PWM; an output circuit to smooth the AC voltage from the transformer and supply the smoothed voltage to various components; a sync signal supplier to generate a sync signal having a frequency equal to a frequency of a horizontal sync signal, which is externally input, to generate the PWM signal which is synchronized to the horizontal sync signal, and to supply the sync signal to the PWM; and a controller to determine a power saving mode depending on whether the horizontal sync signal and/or a vertical sync signal is externally input, and to control the sync signal supplier to generate the sync signal having a frequency equal to the frequency of the horizontal sync signal by outputting a signal corresponding to the power saving mode and a clamp signal generated from the input horizontal sync signal to the sync signal supplier to supply power according to the determined power saving mode.

According to an aspect of the present invention, the controller determines the power saving mode to be a normal operation mode when the horizontal and vertical sync signals are sensed, and outputs a normal operation mode signal and the clamp signal to the sync signal supplier.

According to an aspect of the present invention, the controller determines the power saving mode to be a power off mode when neither the horizontal nor vertical sync signals are sensed, and outputs a power off mode signal to the sync signal supplier but the clamp signal is not output.

According to an aspect of the present invention, the power supply system of a display apparatus further comprises a switcher to ground a first terminal of the sync signal supplier when the normal operation mode signal is supplied by the controller, and to not ground the first terminal of the sync signal supplier when the power off mode signal is supplied from the controller.

According to an aspect of the present invention, the power supply system further comprises a capacitor provided between the sync signal supplier and the controller to filter a DC component of the clamp signal from the controller.

According to an aspect of the present invention, the controller provides a predetermined frequency of a toggle signal to the sync signal supplier to generate the sync signal with a frequency equal to the frequency of the horizontal sync signal while the clamp signal is delayed when the display apparatus is determined to switch to the normal operation mode from the power off mode.

According to another aspect of the present invention, the foregoing and/or other aspects may be also achieved by providing a control method of a power supply system of a display apparatus comprising a DC converter to convert an alternating current voltage into a DC voltage; a PWM to generate a PWM signal; a transformer to receive the DC voltage of the DC converter and to output an AC voltage according to the PWM signal; an output circuit to smooth the AC voltage from the transformer and to supply the smoothed voltage to various components, the method comprising determining a power saving mode depending on whether horizontal and/or vertical sync signals are externally input; outputting a corresponding power saving mode signal and a clamp signal generated from the input horizontal sync signal to supply power according to the determined power saving mode; and generating a sync signal whose frequency is equal to a frequency of the horizontal sync signal according to the output power saving mode signal and the clamp signal and outputting the sync signal to the PWM.

According to an aspect of the present invention, the control method, further comprises determining the power saving mode to be a normal operation mode when both the horizontal and vertical sync signals are sensed, and outputting a normal operation mode signal and a clamp signal to generate a sync signal having a frequency equal to the frequency of the horizontal sync signal, and outputting the sync signal to the PWM.

According to an aspect of the present invention, the control method further comprises determining the power saving mode to be a power off mode when neither the horizontal nor vertical sync signals are sensed, and outputting a power off mode signal, but not a clamp signal, so that the sync signal having a frequency equal to the frequency of the horizontal sync signal is not generated.

According to an aspect of the present invention, the control method of a power supply system of a display apparatus further comprises outputting a toggle signal having a predetermined frequency to generate a sync signal having a frequency equal to the frequency of the horizontal sync signal while the clamp signal is delayed when the display apparatus is determined to switch back into the normal operation mode from the power off mode.

BRIEF DESCRIPTION OF THE DRAWINGS

These and/or other aspects and/or advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
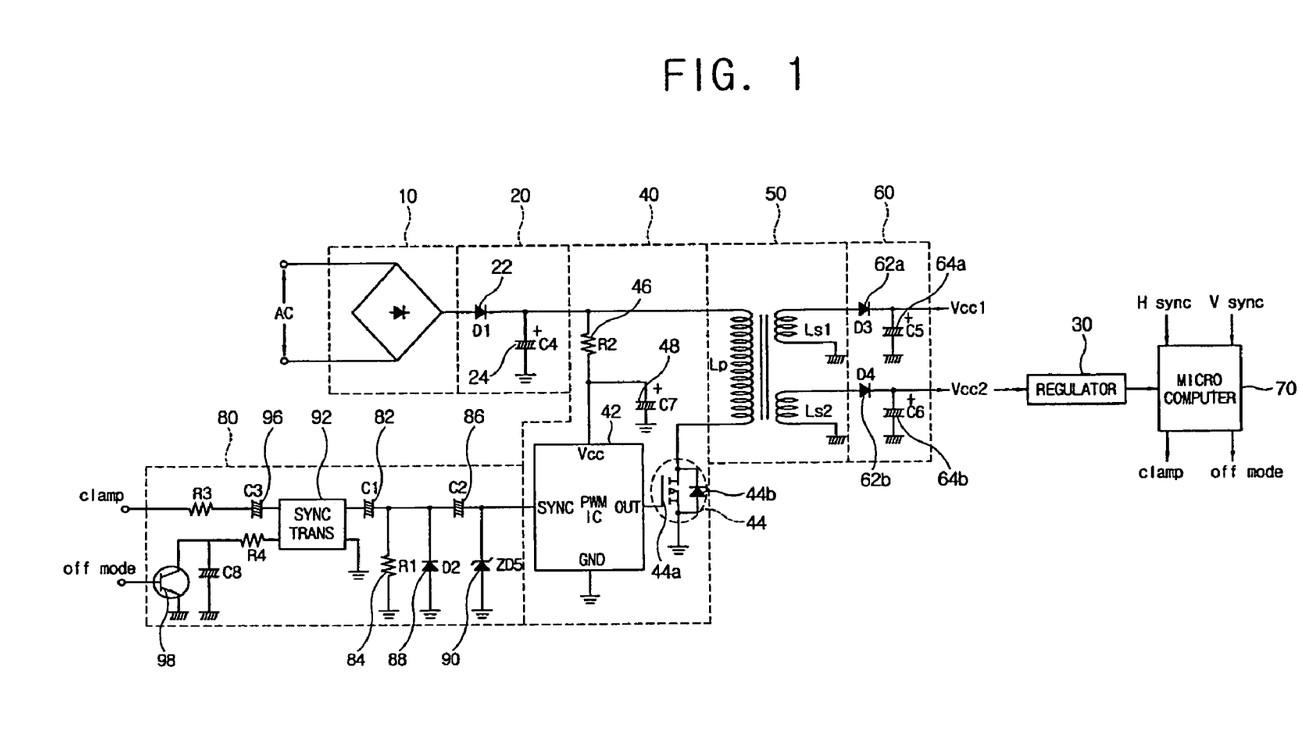
FIG. 1 is a circuit diagram of a power supply system of a display apparatus according to an aspect of the present invention.

FIG. 1 is a circuit diagram of a power supply system of a display apparatus according to an aspect of the present invention. As shown therein, the power supply system of the display apparatus comprises a fullwave rectifier 10 to convert an external AC (Alternating Current) voltage into a DC (Direct Current) voltage; a smoother 20 to smooth the output voltage of the fullwave rectifier 10; a PWM 40 having a PWM IC 42 to generate a PWM signal and a transistor 44a turned on/off according to the PWM signal from the PWM IC 42; a sync signal supplier 80 to supply a sync signal to the PWM 40; a switching transformer 50; an output circuit 60 to rectify the voltages which are respectively induced from the secondary windings Ls1 and Ls2 of the switching transformer 50 and to output the rectified voltage; a regulator 30 to lower output voltage Vcc1 and Vcc2 from the output circuit 60; and a microcomputer 70 to receive the voltage which has been lowered to a predetermined voltage level by the regulator 30 as an operation voltage and to thereby control the display apparatus.

According to an aspect of the present invention, the power supply system of the display apparatus comprises a feedback circuit (not shown) to maintain the output voltage Vcc1 and Vcc2 at regular voltage levels.

According to an aspect of the present invention, the fullwave rectifier 10 comprises a bridge diode circuit. The output voltage of the fullwave rectifier 10 is filtered in the smoother 20 and supplied to a power input terminal Vcc of the PWM IC 410 through a resistor (R2) 46 and a capacitor (C7) 48, and at the same time supplied to a primary winding Lp of the switching transformer 50.

According to an aspect of the present invention, the PWM IC 42 with the power applied thereto turns on/off the transistor 44a by outputting the PWM signal to the transistor 44a. As the transistor 44a is turned on/off, a pulse signal is applied to the primary winding Lp of the switching transformer 50 to induce an AC voltage in the secondary windings Ls1 and Ls2.

According to an aspect of the present invention, an output voltage from the secondary windings Ls1 and Ls2 of the switching transformer 50 are rectified to the Vcc1 and Vcc2 voltage levels using diodes (D3) 62a and (D4) 62b and capacitors (C5) 64a and (C6) 64b. The voltages Vcc1 and Vcc2 can be predetermined voltages for an operation of the display apparatus, and include 80V, 50V, 14V, and 7V.

According to an aspect of the present invention, the output voltages Vcc1 and Vcc2 of the output circuit 60 are lowered to the predetermined voltage level by the regulator 30 and supplied to various components such as a microcomputer 70, a video amplifier (not shown), etc.

According to an aspect of the present invention, the microcomputer 70 reduces the power consumed by the display apparatus by switching the power into a DPMS (Display Power Management Signaling) mode, which is a power saving mode, depending on whether a horizontal sync signal and/or a vertical sync signal are sensed as being output from a computer main body. Herein, the DPMS modes include a normal operation mode, a stand-by mode, a suspend mode, and a power-off mode.

As a control mode, the normal operation mode supplies power to the display apparatus normally. Both the vertical and the horizontal sync signal pulses are sensed in this mode.

The stand-by mode and the suspend mode stop displaying a video by selectively muting a video signal processed in a video signal processor (not shown). In the stand-by mode, the microcomputer 70 senses the vertical sync signal pulse only, and in the suspend mode, the microcomputer 70 senses the horizontal sync signal pulse only.

The power-off mode turns off the power supplied to the display apparatus, and neither the vertical sync signal pulse nor the horizontal sync signal pulse are sensed by the microcomputer 70 in this mode.

According to an aspect of the present invention, the DPMS mode is sequentially switched (normal operation mode-→stand-by mode-→suspend mode-→power-off mode) corresponding to an idle time of the computer system.

However, in another aspect of the present invention, the microcomputer 70 is switched from the normal operation mode into the power-off mode.

Herein, the microcomputer 70 comprises a clamp port to output a clamp signal, and a power-off mode port to output a power-off mode signal, depending on whether the horizontal sync signal and/or the vertical sync signal are sensed. Here, the clamp signal is a toggle signal generated based on the horizontal sync signal.

The power supply system is determined to be in the normal operation mode if the microcomputer 70 senses both the horizontal sync signal and the vertical sync signal. The microcomputer 70 then generates the clamp signal and outputs the clamp signal through the clamp port, and outputs a high signal through the power-off mode port.

On the other hand, the power supply system is determined to be in the power-off mode if the microcomputer 70 senses neither the horizontal sync signal nor the vertical sync signal. The microcomputer 70 then outputs a low signal through the power-off mode port. The clamp signal is not generated because no horizontal sync signal is sensed.

Further, the microcomputer 70 outputs the toggle signal through the power-off mode port while the clamp signal is delayed when the power supply system is in the power-off mode and is switched to the normal operation mode, thereby preventing the microcomputer 70 from being reset.

The sync signal supplier 80 receives the clamp signal and the power-off mode signal from the microcomputer 70 and supplies a sync signal, whose frequency is equal to a frequency of the horizontal sync signal, to the PWM IC 42.

The clamp signal output from the microcomputer 70 is applied to a sync transformer 92 (hereinbelow, "a sync trans") through a resistor (R3) and a capacitor (C3) 96, and the power-off mode signal controls a transistor 98 connected to the sync trans 92 to be turned on/off. The transistor 98 is an NPN transistor, and is turned on when a high signal is applied thereto. When the transistor 98 is turned on, a primary terminal of the sync trans 92 is grounded. Herein, the capacitor (C3) 96 filters a DC component of the clamp signal.

The sync trans 92 receives the clamp signal through the primary terminal, and outputs a sync signal amplified approximately $\frac{1}{10}$ times to a secondary terminal disconnected from the grounded primary terminal to supply to the PWM IC 42 through capacitors (C1) 82 and (C2) 86, a resistor (R1) 84, and diodes (D2) 88 and (ZD5) 90. The PWM IC 42 generates a PWM signal synchronized to the sync signal inputted to the PWM IC 42 and turns on/off the transistor 44a.

Herein, the capacitor (C1) 82 is used to lower the voltage of the sync signal, the resistor (R1) 84 provides a discharge route for the capacitor (C1) 82, and the diode (D2) 88 prevents the pulse of the sync signal from being lowered below 0.7 V. The capacitor (C2) 86 filters a DC (5V) component of the sync signal, and a zener diode (ZD5) 90 protects the PWM IC 42 from a sync signal in the case of an abnormally high voltage.

Figure 2:
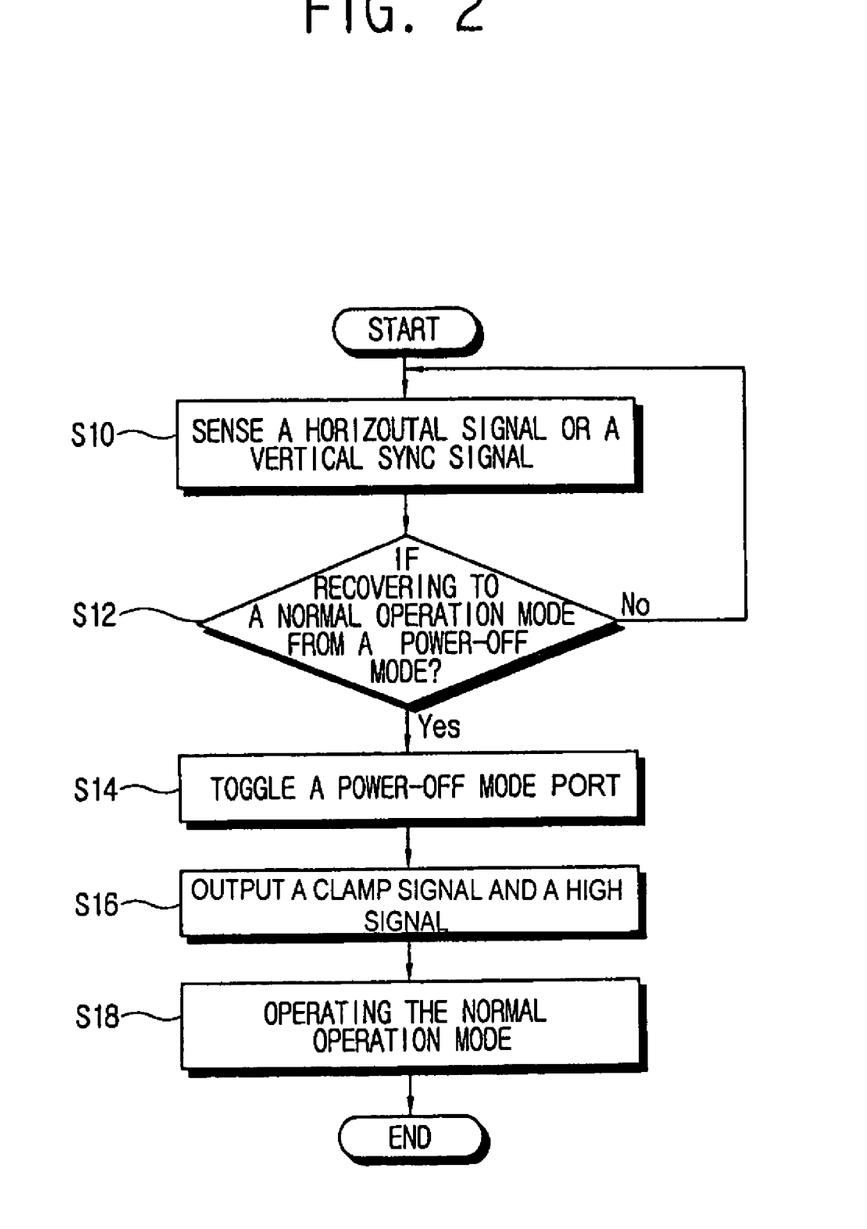
FIG. 2 is a control flow of the power supply system of the display apparatus according to an aspect of the present invention.

With this configuration, a control flow of the power supply system according to an aspect of the present invention can be described as follows referring to FIG. 2.

Prior to describing the control flow, it is assumed in this aspect of the present invention that the microcomputer 70 senses neither the horizontal sync signal nor the vertical sync signal, that is, the power supply system is in the power-off mode.

Initially, the microcomputer 70 senses the horizontal and the vertical sync signal at operation S10. If the microcomputer 70 determines that the power supply system is switched to the normal operation mode from the power-off mode as a result of sensing both the horizontal and the vertical sync signal at operation S12, the microcomputer 70 outputs the toggle signal through the power-off mode port while the outputting of the clamp signal is delayed at operation S14. The microcomputer 70 outputs the high signal through the power-off mode port and the clamp signal through the clamp port at operation S16. Accordingly, the sync signal supplier 80 receives the clamp signal and the power-off mode signal from the microcomputer 70 and generates a sync signal whose frequency is equal to the frequency of the horizontal sync signal and supplies the sync signal to the PWM IC 42, thereby operating the display apparatus in the normal operation mode at operation S18.

Figure 3:
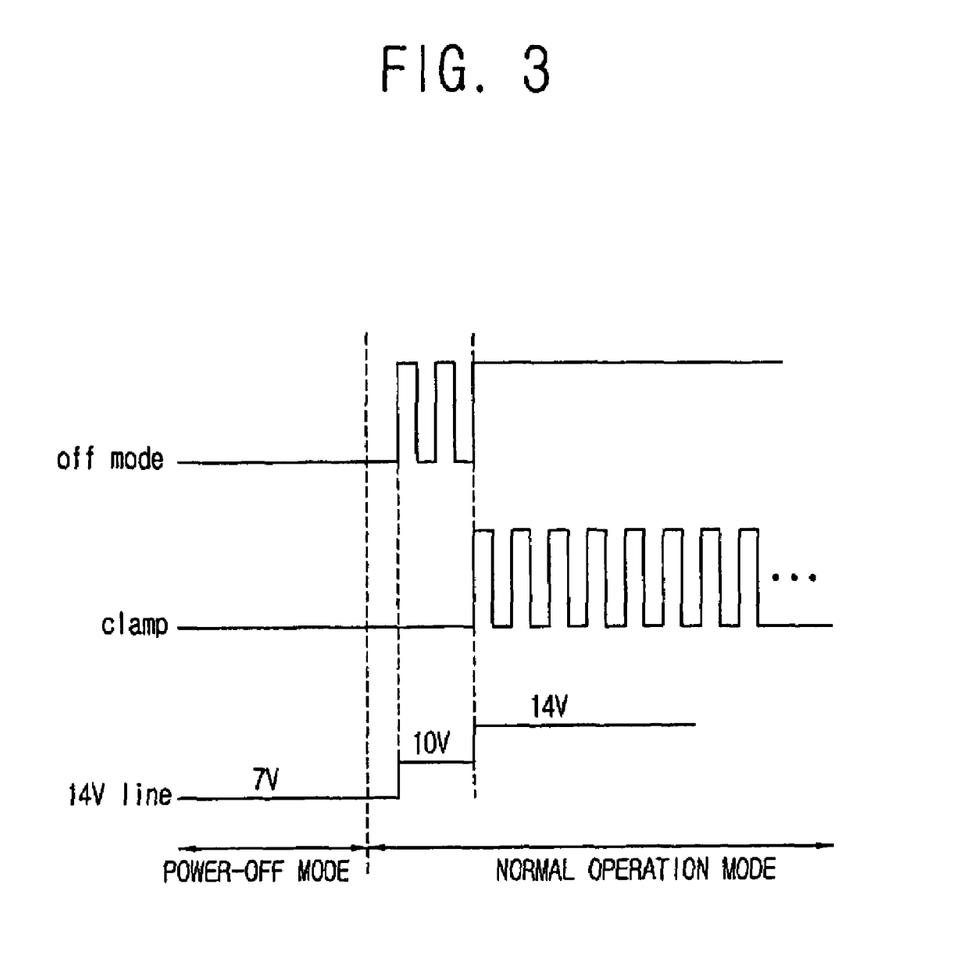
FIG. 3 is a waveform of a power-off mode signal, a clamp signal, and 14V line in a power-off mode and a normal operation mode in FIG. 1.

FIG. 3 illustrates waveforms of the power-off mode signal, the clamp signal, and a 14V power line output from the microcomputer 70 in the power-off mode and the normal operation mode.

As shown therein, the microcomputer 70 in the power-off mode outputs the low signal through the power-off mode port and does not output the clamp signal. In this case, a power line of a secondary terminal of the switching transformer 50, for example, the 14V power line, drops to 7V. If the microcomputer 70 senses both the horizontal and the vertical sync signal and thus the power supply system is determined to be in the normal operation mode, the microcomputer 70 outputs the toggle signal through the power-off mode port while the outputting of the clamp signal is delayed, thereby increasing the 14V power line to 10V, and then recovers the 14V power line to a predetermined regular voltage (14V) by outputting the clamp signal and the high signal.

The present invention provides a power supply system with the microcomputer 70 generating the clamp signal and the power-off mode signal to output to the sync trans 92 to implement a simple circuit, thereby reducing the cost of the circuit and consuming less power.

Additionally, the microcomputer 70 outputs the toggle signal through the power-off mode port while the outputting of the clamp signal is delayed, thereby preventing the microcomputer 70 from being reset.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A power supply system of a display apparatus comprising:
   a DC converter to convert an AC voltage into a DC voltage;
   a Pulse Width Modulator to generate a Pulse Width Modulation (PWM) signal;
   a transformer to receive the DC voltage of the DC converter, and to output an AC voltage according to the Pulse Width Modulation signal from the Pulse Width Modulator;
   an output circuit to smooth the AC voltage from the transformer and supply the smoothed AC voltage to various components;
   a sync signal supplier to generate a sync signal having a frequency equal to a frequency of a horizontal sync signal, the horizontal sync signal being externally input, to generate the Pulse Width Modulation signal synchronized to the horizontal sync signal and to supply the sync signal to the Pulse Width Modulator; and
   a controller to determine a power saving mode depending on whether the horizontal sync signal and/or a vertical sync signal is externally input, and to control the sync signal supplier by outputting a power saving mode signal and a clamp signal, generated according to the input horizontal sync signal, to the sync signal supplier to supply power according to the determined power saving mode.

2. The power supply system according to claim 1, wherein when the horizontal and vertical sync signals are sensed the controller determines the power saving mode to be a normal operation mode and the controller outputs a normal operation mode signal and the clamp signal to the sync signal supplier.

3. The power supply system according to claim 1, wherein when neither the horizontal nor vertical sync signals are sensed the controller determines the power saving mode to be a power-off mode and the controller outputs a power-off mode signal to the sync signal supplier wherein the clamp signal is not output.

4. The power supply system according to claim 2, further comprising a switcher to ground a first terminal of the sync signal supplier when the normal operation mode signal is supplied from the controller, and to not ground the first terminal of the sync signal supplier when the power-off mode signal is supplied from the controller.

5. The power supply system according to claim 3, further comprising a switcher to ground a first terminal of the sync signal supplier when the normal operation mode signal is supplied from the controller, and to not ground the first terminal of the sync signal supplier when the power-off mode signal is supplied from the controller.

6. The power supply system according to claim 1, further comprising a capacitor provided between the sync signal supplier and the controller to filter a DC component of the clamp signal from the controller.

7. The power supply system according to claim 1, wherein when the display apparatus is determined to switch to the normal operation mode from the power-off mode, the controller provides a toggle signal having a predetermined frequency to the sync signal supplier to generate the sync signal having a frequency equal to the frequency of the horizontal sync signal while the clamp signal is delayed.

8. The power supply system according to claim 2, wherein when the display apparatus is determined to switch to the normal operation mode from the power-off mode, the controller provides a toggle signal having a predetermined frequency to the sync signal supplier to generate the sync signal having a frequency equal to the frequency of the horizontal sync signal while the clamp signal is delayed.

9. The power supply system according to claim 3, wherein when the display apparatus is determined to switch to the normal operation mode from the power off-mode, the controller provides a toggle signal having predetermined frequency to the sync signal supplier to generate the sync signal having a frequency equal to the frequency of the horizontal sync signal while the clamp signal is delayed.

10. A control method of a power supply system of a display apparatus, wherein the power supply system comprises a DC converter to convert an AC voltage into a DC voltage; a PWM generating a PWM signal; a transformer to receive the DC voltage of the DC converter and to output an AC voltage according to the PWM signal from the PWM; an output circuit to smooth the AC voltage from the transformer and to supply the smoothed voltage to various components, the control method comprising:

determining a power saving mode depending on whether horizontal and/or vertical sync signals are externally input;

outputting a corresponding power saving mode signal and a clamp signal generated from the input horizontal sync signal to supply power according to the determined power saving mode;

generating a sync signal whose frequency is equal to a frequency of the horizontal sync signal according to the output power saving mode signal and the clamp signal; and     outputting the sync signal to the PWM.

11. The control method according to claim 10, further comprising:

determining the power saving mode to be a normal operation mode when both the horizontal and the vertical sync signals are sensed;

outputting a normal operation mode signal and the clamp signal to generate the sync signal having a frequency equal to the frequency of the horizontal sync signal; and     outputting the sync signal to the PWM.

12. The control method according to claim 10, further comprising, determining the power saving mode as an power-off mode when neither the horizontal nor vertical sync signals are sensed, and outputting a power-off mode signal but not the clamp signal so that the sync signal having a frequency equal to the frequency of the horizontal sync signal is not be generated.

13. The control method according to claim 10, wherein when the display apparatus is determined to switch to the normal operation mode from the power off mode,     a toggle signal having a predetermined frequency is output to generate a sync signal having a frequency equal to the frequency of the horizontal sync signal while the clamp signal is delayed.

14. The control method according to claim 11, wherein when the display apparatus is determined to switch to the normal operation mode from the power off mode,     a toggle signal having a predetermined frequency is output to generate a sync signal having a frequency equal to the frequency of the horizontal sync signal while the clamp signal is delayed.

15. The control method according to claim 12, wherein when the display apparatus is determined to switch to the normal operation mode from the power off mode,     a toggle signal having a predetermined frequency is output to generate a sync signal having a frequency equal to the frequency of the horizontal sync signal while the clamp signal is delayed.

* * * * *

UNITED STATES PATENT AND TRADEMARK OFFICE
CERTIFICATE OF CORRECTION

PATENT NO. : 7,095,633 B2  
APPLICATION NO. : 10/936490  
DATED : August 22, 2006  
INVENTOR(S) : Ho-jin Byun Page 1 of 1

It is certified that error appears in the above-identified patent and that said Letters Patent is hereby corrected as shown below:

On Title Page item 57

First Page Column 2 (Abstract), Line 2, change "(Direct current)" to --(Direct Current)--.

Column 8, Line 63, change "power off-mode" to --power-off mode,--.

Column 10, Line 8, after "not" delete "be".

Signed and Sealed this

Thirtieth Day of January, 2007

JON W. DUDAS  
*Director of the United States Patent and Trademark Office*